United States Patent [19]

Johnson

[11] 4,286,511
[45] Sep. 1, 1981

[54] PACKER LATCH FOR MODULE BUILDER

[75] Inventor: Don R. Johnson, Wolfforth, Tex.

[73] Assignee: Harris & Thrush Manufacturing Company, Wolfforth, Tex.

[21] Appl. No.: 161,126

[22] Filed: Jun. 19, 1980

[51] Int. Cl.³ .............................................. B30B 13/00
[52] U.S. Cl. ..................................... 100/35; 100/100
[58] Field of Search ................... 100/100, 226, 269 R, 100/214, 35

[56] References Cited

U.S. PATENT DOCUMENTS

| 3,298,550 | 1/1967 | Schlitz | 414/491 |
| 3,404,622 | 10/1968 | Flanagan | 100/100 |
| 3,749,003 | 7/1973 | Wilkes | 100/100 |
| 3,851,577 | 12/1974 | Newcom | 100/100 |
| 3,941,047 | 3/1976 | Orlando | 100/100 |
| 3,961,572 | 6/1976 | Johnston | 100/100 |

FOREIGN PATENT DOCUMENTS 223732 9/1959 Australia ................................. 100/100

Primary Examiner—Billy J. Wilhite
Attorney, Agent, or Firm—Wendell Coffee

[57] ABSTRACT

A cotton module builder has a hydraulic cylinder which extends far above the top of the builder in operating position. The cylinder is latched in the upper position so that it may be lowered when the module builder is moved. A hook on the cylinder is engaged by bails upon a toggle lever so that the latch will not release the cylinder unless the cylinder is in a relaxed condition.

4 Claims, 7 Drawing Figures

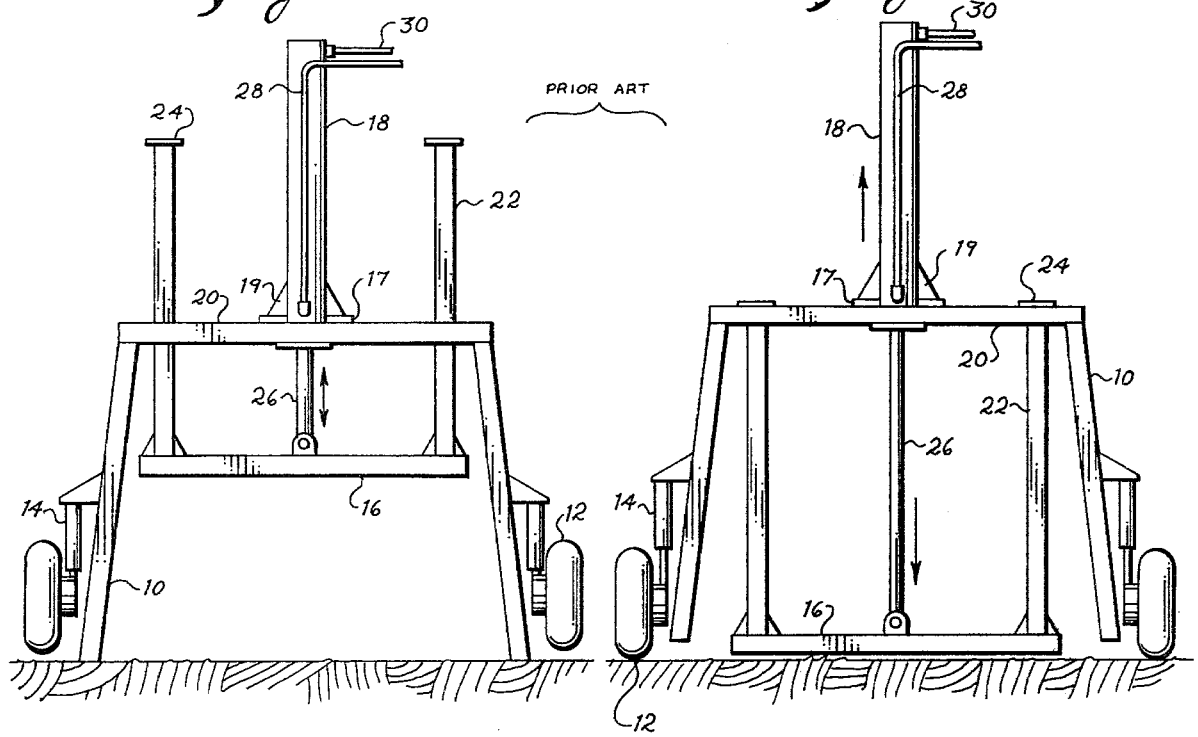

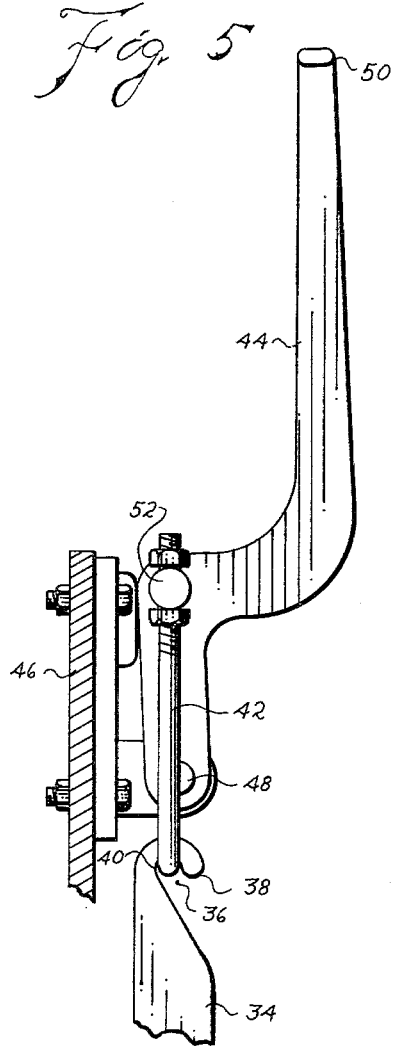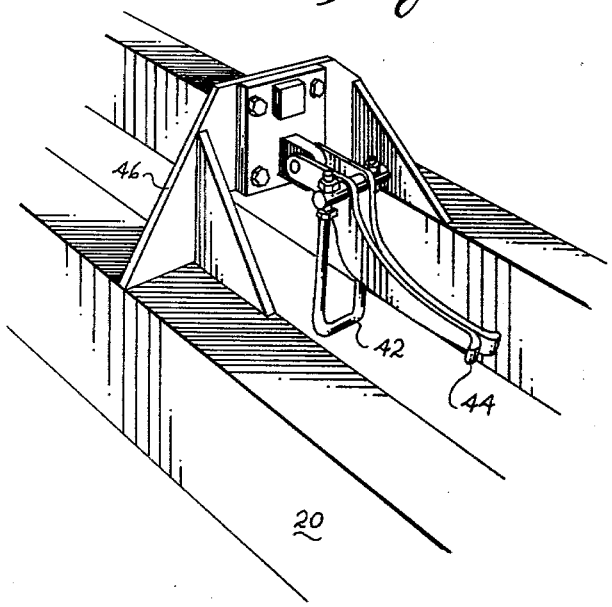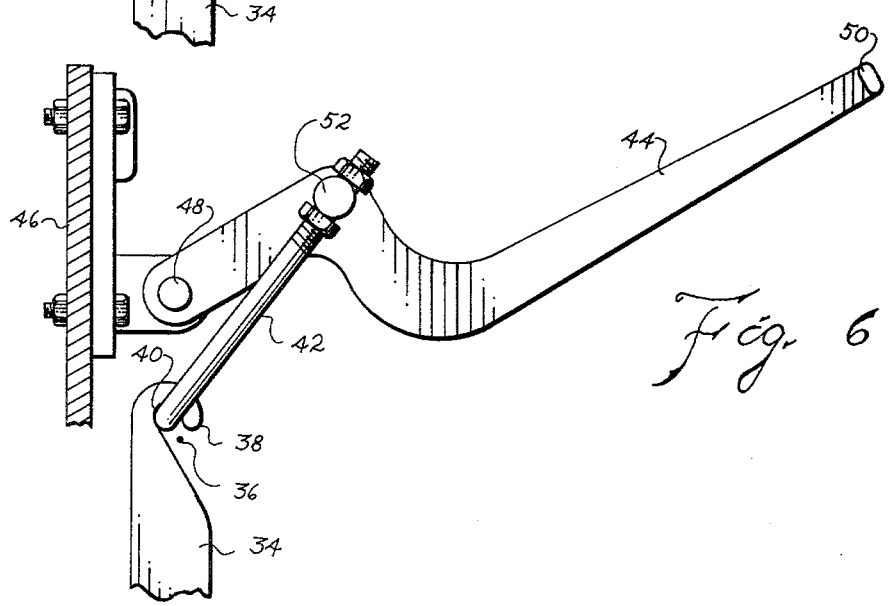

PACKER LATCH FOR MODULE BUILDER

BACKGROUND OF THE INVENTION

(1) Field of the Invention

This invention relates to making cotton modules and more particularly to latching the packer cylinder in the operative position.

(2) Description of the Prior Art

In recent years module builders or makers have been developed for forming harvested seed cotton into modules for field storage before moving the modules to the gin. The modules are stacks of cotton which have been firmly packed so that they are self supporting and form a unitary unit even when they are picked up on a truck to be moved.

The basic module maker is shown in U.S. Pat. Nos. 3,749,003 and 3,941,047. The modules are moved by equipment originally designed to move haystacks and shown in U.S. Pat. No. 3,298,550.

As seen, the module maker itself has a front and two sidewalls. The side walls are angled outwardly so that the module is tapered. Therefore, by raising the module maker upward the sides come free from the module. Then, the module maker can be moved to another location for making another module. If the move entails moving the module maker under electrical high lines or along highways or the like, it is necessary to lower the hydraulic cylinder which is used for packing the cotton in the module. See U.S. Pat. No. 3,941,047. Normally, in commercial practice the cylinders are held in the raised position by having ears upon the bottom of the hydraulic cylinder and having a plate or latch placed between the carriage and the ears. The carriage is mounted for longitudinal movement along the side walls and it carries the hydraulic cylinder. The hydraulic cylinder has a ram telescoped within which depends vertically downward and is connected to the middle of the tramper foot. The tramper foot is that lower portion which tramps the cotton within the side walls. The carriage is moved back and forth along the side walls to bring the tramper foot to bear upon different portions of the cotton while the module is being made. When the tramper itself is in the elevated position if the latches are removed, which is possible with the latches on the models which are commercially used today, the entire cylinder together with the tramper falls—often with disastrous results. The correct procedure is to lower the tramper to the full extent so that the cylinder is relaxed or supported by pressure upon the reciprocating ram and then when the latch is removed the cylinder can be lowered gently by control of the hydraulic fluid.

SUMMARY OF THE INVENTION

(1) New and Different Function

I have invented a latch for latching the hydraulic cylinder to the carriage which can be operated only if the hydraulic cylinder is in the relax position. I.e., it can be operated only if the tramper is in the full down position and the cylinder is supported by the hydraulic pressure bearing against the tramper foot.

I do this by placing hooks upon the bottom of the cylinder and by using a bail to engage the hooks. The bails in the latch position will be raised and held in the raised position by a toggle lever. Should the operator inadvertently attempt to release the latch while weight is suspended from the cylinder, as the lever lowers the bail the bail will not come free of the hook but will remain engaged, maintaining the cylinder in the supported position. The bails can be disengaged from the hooks only by maintaining the cylinder in the elevated position as is the case when the cylinder is supported by the foot.

Thus, it may be seen that the total function of my invention far exceeds the sum of the functions of the individual hooks, bails, levers, cylinders, etc.

(2) Objects of this Invention

An object of this invention is to make cotton modules safely and to move the module builder from one location to another safely.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWINGS:

FIG. 1 is a schematic representation of a prior art device having the tramper of a module builder in the operating position.

FIG. 2 is a schematic representation of the prior art device with the tramper foot in the full down position.

FIG. 3 is a schematic representation of my invention with the cylinder being gently lowered.

FIG. 4 is a schematic representation of my invention with the cylinder in the full lowered or travel position.

FIG. 5 is a side elevational view of the hook, bail and lever of my invention in the up position with the bracket in section.

FIG. 6 is a view similar to FIG. 5 of the hook, bail and lever in the down position.

FIG. 7 is a perspective view thereof with the bail free of the hook.

DESCRIPTION OF THE PREFERRED EMBODIMENT

Referring to the drawing and particularly FIGS. 1–4 there may be seen a module builder. As stated above and with reference to the identified prior art the module builder includes side walls 10. These side walls angle outward so that after the module has been formed that elevation of the side walls by wheels 12 as shown in FIG. 2 will cause the module builder to release the module so that the module is not damaged as the builder is moved forward. The wheels are readily moved up and down by the wheel raisers 14 attached to the outside of the side walls 10.

Before the tramper foot 16 can be lowered to the full lower position as seen in FIG. 2 it must be picked up and moved away from the module. Otherwise, the cotton module itself would block the downward passage of the tramper foot 16. Therefore, it may be seen that after the tramper foot 16 is raised and the module builder moved it is the natural inclination of the operator to pull the latches 17 under ears 19 to lower cylinder 18. However, if this is done in that position, the entire cylinder 18 and tramper foot 16 will fall for the full stroke of the tramper foot resulting in severe damage to the equipment.

Carriage 20 spans the module builder and the module. Carriage 20 extends from one side wall 10 to the other being mounted for travel along the side walls as shown in the prior art. The tramper foot 16 is connected to guide rods 22 which guide the travel of the tramper foot up and down. These guide rods together with the stops 24 on the guide rods above the carriage 20 form the tramper. The cylinder 18 has piston rod or ram 26 telescoped therein. By hydraulic pressure introduced through lines 28 and 30 the ram 26 together with the tramper is raised and lowered to tramp the cotton thus forming the module. Hydraulic pressure in the lines 28 and 30 is supplied by a pump not shown and controlled by valves not shown. However, these are all known to the art and for clarity and conciseness of this application have not been shown inasmuch as they are all well known in the art.

The module builder and its operation are well known and commercially available on the market as described to this point.

My improved invention includes plate 32 attached to the bottom of the cylinder 18. This plate has two hooks 34. There is one hook on each side. Inasmuch as each of the hooks and the latch mechanism are identical, only one will be described in detail. It will be understood that the other is identical thereto. The hooks include the opening 36 on the outboard side of the hook and has the point 38 of the hook below the bight 40 of the hook. Therefore, if a rod or bail 42 is engaged in the hook 34 and is in the bight 40 thereof, the bail 42 cannot be removed unless the bail is below the point 38.

Bail 42 is carried upon toggle lever 44 which functions as a bail operator. The lever 44 is pivoted to bracket 46 upon the carriage 20. The lever extends from its pivot 48 to handle 50. The pivot 48 pivots the lever 44 to the bracket 46. The handle extends outward so that the lever may be raised to a locking position where the bail is raised in the bight 40 of the hook 34 as seen in FIG. 5 or lowered to an unlatch position where the bail is lowered, as seen in FIG. 7. The bail 42 is connected at center pivot 52. The bail 42, lever 44 and hook 34 are arranged so that when the lever is in the up or latch position that the bail is past dead center. I.e., the bail 42 is closer to the bracket 46 than is the pivot 48. Therefore, there is no possibility of the lever 44 accidently opening because of the weight of the equipment hanging from the hook 34.

Thus, it may be seen that if there is any weight suspended from the hooks that when the lever is brought down the hooks will move down with the bails and the bails will not become disengaged from the hooks. I.e., the cylinder will remain supported by the bails even though not in the full up position.

However, should the tramper be all the way down and the cylinder supported by the hydraulic pressure which pushes the tramper down, when the lever are lowered the bails will come free of the hooks and can be disengaged from the hooks. Thereafter, when hydraulic fluid is released from the cylinder, the cylinder will gently descend (FIG. 3) to a lower position resting upon the packer foot (FIG. 4).

Thus, it may be seen that the cylinder can be lowered only if it is supported by hydraulic fluid and that it is impossible for the operator mistakenly or negligently or accidently release the cylinder unless the cylinder is thus supported.

As an aid in correlating the terms of the claims to the exemplary drawings, the following catalog of elements is provided:

| 10 | side walls | 30 | hydraulic line |
|----|------------|----|----------------|
| 12 | wheels | 32 | plate |
| 14 | wheel raisers | 34 | hooks |
| 16 | tramper foot | 36 | opening |
| 17 | latches | 38 | point |
| 18 | cylinder | 40 | bight |
| 19 | ears | 42 | bail |
| 20 | carriage | 44 | lever |
| 22 | guide rods | 46 | bracket |
| 24 | stops | 48 | pivot |
| 26 | ram | 50 | handle |
| 28 | hydraulic line | 52 | center pivot |

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a cotton module builder having
   a. side walls,
   b. a carriage extending from one side wall to the other,
   c. a tramper with a foot mounted for vertical reciprocation to the carriage,
   d. a hydraulic cylinder having a lower end on the carriage and having
   e. a reciprocating ram telescoped within cylinder and attached to the tramper foot,
   an improved latch for releasably holding the hydraulic cylinder on the carriage comprising:
   f. at least one hook on the lower end of the cylinder,
   g. a toggle lever pivoted to the carriage and
   h. a bail pivoted on the lever,
   i. said bail engaging the hook.

2. The invention as defined in limitations a. through i. of claim 1 further comprising:
   j. two hooks, toggle levers and bails in the combination as defined above.

3. The process involving a cotton module builder having
   a. side walls,
   b. a carriage extending from one side wall to the other,
   c. a tramper with a foot mounted for vertical reciprocation to the carriage,
   d. a hydraulic cylinder having a lower end on the carriage and having
   e. a reciprocating ram telescoped within cylinder and attached to the tramper foot;
   wherein the improved method comprises:
   f. latching the cylinder in the raised position by
   g. holding hooks on the cylinder with bails,
   h. raising the bails to a raised position to latch the cylinder in the raised position, and
   i. releasing the bails by j. relaxing the strain upon the bails by k. lowering the foot to the full lowered position, and l. forcing the cylinder up with hydraulic pressure therein and m. lowering the bails downward and free of the hooks.

4. In a cotton module builder having a. side walls, b. a carriage extending from one side wall to the other, c. a tramper with a foot mounted for vertical reciprocation to the carriage, d. a hydraulic cylinder having a lower end on the carriage and having e. a reciprocating ram telescoped within cylinder and attached to the tramper foot, an improved latch for releasably holding the hydraulic cylinder on the carriage comprising:

f. at least one hook on the lower end of the cylinder, g. a bail operator attached to the carriage and h. a bail connected to the bail operator, i. said bail engaging the hook.

* * * * *